(12) United States Patent
Jesberger et al.

(10) Patent No.: US 7,829,175 B2
(45) Date of Patent: Nov. 9, 2010

(54) MULTILAYER, WHITE POLYESTER FILM

(75) Inventors: Martin Jesberger, Mainz (DE);
Herbert Peiffer, Mainz (DE); Dirk Broeder, Schweppenhausen (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 880 days.

(21) Appl. No.: 11/693,892

(22) Filed: Mar. 30, 2007

(65) Prior Publication Data

US 2007/0240075 A1    Oct. 11, 2007

(30) Foreign Application Priority Data

Apr. 5, 2006    (DE) .................. 10 2006 015 941

(51) Int. Cl.
| B32B 27/06 | (2006.01) |
| B32B 27/18 | (2006.01) |
| B32B 27/20 | (2006.01) |
| B32B 27/36 | (2006.01) |
| B32B 37/15 | (2006.01) |

(52) U.S. Cl. .............. 428/141; 428/323; 428/328; 428/480; 428/910; 524/418; 524/423; 524/436; 264/173.16; 264/288.4; 264/290.2

(58) Field of Classification Search ............... None
See application file for complete search history.

(56) References Cited

U.S. PATENT DOCUMENTS

| 5,591,518 A * | 1/1997 | Sumiya et al. | 428/318.4 |
| 6,627,695 B2 * | 9/2003 | Murschall et al. | 524/513 |
| 6,641,924 B1 * | 11/2003 | Peiffer et al. | 428/480 |
| 6,841,222 B2 * | 1/2005 | Murschall et al. | 428/141 |
| 6,884,517 B2 * | 4/2005 | Peiffer et al. | 428/480 |
| 7,090,915 B2 * | 8/2006 | Murschall et al. | 428/220 |
| 2002/0160215 A1 * | 10/2002 | Peiffer et al. | 428/480 |
| 2002/0176978 A1 * | 11/2002 | Murschall et al. | 428/220 |
| 2003/0049472 A1 * | 3/2003 | Murschall et al. | 428/480 |
| 2004/0028928 A1 * | 2/2004 | Bennett et al. | 428/483 |
| 2004/0151877 A1 * | 8/2004 | Suh et al. | 428/141 |
| 2005/0238900 A1 * | 10/2005 | Kiehne et al. | 428/480 |

FOREIGN PATENT DOCUMENTS

| DE | 26 47 713 A1 | | 4/1977 |
| DE | 10007729 | * | 8/2001 |
| DE | 100 26 166 A1 | | 11/2001 |
| EP | 1 125 937 A2 | | 8/2001 |
| EP | 1 125 966 | | 8/2001 |
| JP | 11-042751 | * | 2/1999 |
| JP | 2001-171062 | * | 6/2001 |
| JP | 2003-342404 | * | 12/2003 |
| WO | WO 01/60140 | | 8/2001 |

* cited by examiner

*Primary Examiner*—Vivian Chen
(74) *Attorney, Agent, or Firm*—ProPat, L.L.C.

(57) ABSTRACT

The invention relates to a multilayer, white, biaxially oriented polyester film, which has a base layer B and at least one outer layer (A), where
a) the base layer (B) includes, as sole whitening pigment, a concentration of from 5 to 25% by weight of barium sulfate, and
b) the outer layer (A) includes, as sole whitening pigment, a concentration of from 5 to 25% by weight of barium sulfate, and also includes from 0.01 to 4% by weight of antiblocking agent whose median diameter ($d_{50}$ value) is from 2 to 8 μm.

15 Claims, 1 Drawing Sheet

MULTILAYER, WHITE POLYESTER FILM

CROSS-REFERENCE TO RELATED APPLICATIONS

This application claims priority to German Patent Application 10 2006 015 941.1 filed Apr. 5, 2006 which is hereby incorporated herein by reference in its entirety.

FIELD OF THE INVENTION

The invention relates to a multilayer, white, biaxially oriented polyester film having a base layer (B), which comprises a thermoplastic polyester and, as sole whitening pigment, barium sulfate, and also including at least one outer layer (A). The outer layer (A) comprises not only the sole white pigment barium sulfate but also an antiblocking agent. The invention further relates to a process for the production of the film and to its use.

BACKGROUND OF THE INVENTION

White, biaxially oriented polyester films are known in the prior art.

DE 26 47 713 C2 (equivalent to U.S. Pat. No. 7,090,915 B2) describes a biaxially oriented opaque photographic layer substrate which is comprised of a linear polyester and comprises an amount of from 5 to 50% by weight of barium sulfate, as sole particulate pigment. The average grain size of the barium sulfate particles is from 0.5 to 10 μm. A feature of the biaxially oriented opaque photographic layer substrate is particularly high whiteness and particularly high opacity, without any discoloration of the layer substrate as a consequence of additives present therein, during production. It also has low density, good specular gloss, and low overall light permeability. However, the film retains shortcomings in its production (non-ideal presentation of the roll) and in optical properties.

EP-A-1 125 966 describes a white, opaque film whose thickness is in the range from 10 to 500 μm, which comprises a crystallizable thermoplastic as main constituent, and which is characterized in that the film comprises at least barium sulfate as white pigment, at least one UV stabilizer as light stabilizer, at least one flame retardant, and at least one optical brightener. The proportion of barium sulfate in the film is in the range from 0.2 to 40% by weight, and that of the UV stabilizer as light stabilizer is in the range from 0.01 to 5% by weight, and that of the flame retardant is in the range from 0.5 to 30.0% by weight, and that of the optical brightener is in the range from 10 to 50 000 ppm, based on the weight of the thermoplastic. The varied combination of properties makes the film suitable for various applications, for example for interior cladding, for construction of exhibition stands, and for exhibition requisites, for displays and for placards, for labels, for protective glazing of machinery and of vehicles, in the fitting-out of shops and of stores, as a promotional item or lamination medium, and in food-and-drink applications. However, the film retains shortcomings in its production (non-ideal presentation of the roll) and in optical properties.

EP-A-1 125 937 relates to a white, opaque film with low transparency comprised of a crystallizable thermoplastic, the thickness of the film being in the range from 10 to 500 μm. The film comprises at least barium sulfate as white pigment, and also an optical brightener, and features good orientability, low transparency, and also very good optical and mechanical properties. The barium sulfate and/or the optical brightener are either incorporated into the thermoplastic directly at the premises of the polymer producer or are fed in the form of a masterbatch during film production. The combination of properties of the film makes it suitable for applications comparable with those described above for EP-A-1 125 966 (equivalent to U.S. Pat. No. 7,090,915 B2). However, the film retains shortcomings in its production (non-ideal presentation of the roll) and in optical properties.

SUMMARY OF ADVANTAGEOUS EMBODIMENTS OF THE INVENTION

It was therefore an object of the present invention to provide a white, biaxially oriented polyester film which features improved properties when compared with the polyester films known from the prior art, in particular improved ease of production (i.e. via improved winding), improved processing performance, and improved optical properties (gloss, appearance).

DETAILED DESCRIPTION OF ADVANTAGEOUS EMBODIMENTS OF THE INVENTION

Figure 1:
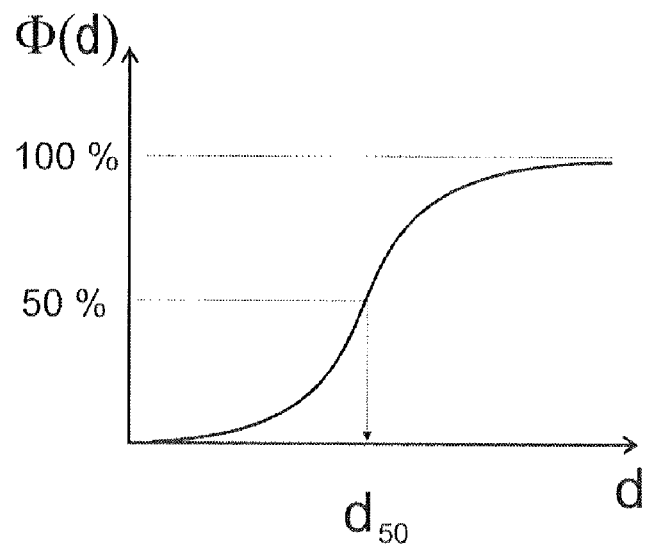
FIG. 1 is an exemplary particle size distribution curve illustrating the median particle size, $d_{50}$, determination.
Figure 2:
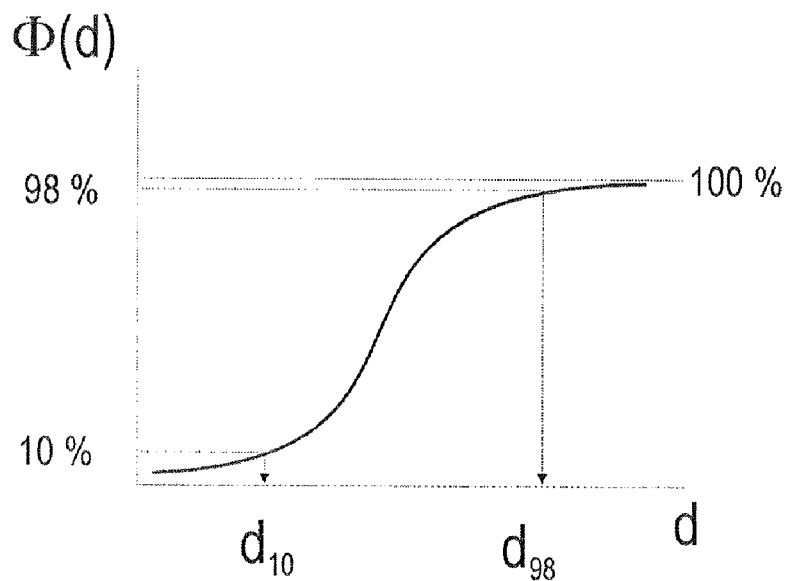
FIG. 2 is an exemplary particle size distribution curve illustrating the $d_{10}$ and $d_{98}$ value determination.

The invention achieves the object via provision of a white, coextruded, biaxially oriented polyester film with a base layer (B) and with at least one outer layer (A), where a) the base layer (B) comprises, as sole whitening pigment, a concentration of from 5 to 25% by weight (based on the weight of the base layer (B)) of barium sulfate, and b) the outer layer (A) comprises, as sole whitening pigment, a concentration of from 5 to 25% by weight of barium sulfate, and also comprises from 0.01 to 4% by weight of antiblocking agent whose median diameter ($d_{50}$ value) is from 2 to 8 μm (% by weight data being based on the weight of the outer layer (A)).

The white, biaxially oriented film as claimed in the present invention has a structure of at least two layers. It is then comprised of the base layer (B) and of the outer layer (A) applied on this via coextrusion, both layers comprising barium sulfate as sole whitening pigment, and the outer layer (A) comprising an additional antiblocking agent which facilitates production of the film (winding) and improvement of optical properties.

In the preferred embodiment, the film has a structure of three—or more than three, for example four or five—layers.

In the case of the preferred three-layer embodiment, the film is comprised of the base layer (B), of the outer layer (A), and of an outer layer (C) opposite to the outer layer (A)—layer structure ABC. Particular preference is given here to the symmetrical three-layer structure (ABA) in which the layers (A) and (C) can be considered identical. This film structure provides the best circumstances for fully satisfactory processing of the film. Asymmetrical film structures, such as (ABC) or in particular the (AB) structure, for example, have a certain tendency toward curling, this being undesirable.

It has been found that the sole use of barium sulfate as colorant pigment (white pigment) the film features particularly high whiteness and particularly high opacity and moreover becomes less susceptible to tearing and delamination. The barium sulfate is preferably added during polymer preparation, the barium sulfate particles usually being added to the glycol from which the polyester is prepared. Addition of the barium sulfate particles by way of masterbatch technology (e.g. during the extrusion) is likewise in principle possible, but has the disadvantage that the film can then have a poorer yellowness index.

Base Layer (B)

The base layer (B) of the film is preferably comprised of at least 80% by weight, in particular at least 85% by weight, and particularly preferably at least 90% by weight, of a thermoplastic polyester. Polyesters suitable for this are, for example, those comprised of ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid [=poly-(1,4-cyclohexanedimethylene terephthalate, PCDT)], and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters comprised of at least 90 mol %, in particular at least 95 mol %, of ethylene glycol units and terephthalic acid units or of ethylene glycol units and naphthalene-2,6-dicarboxylic acid units. The remaining monomer units are derived from other aliphatic, cycloaliphatic, or aromatic diols and/or other dicarboxylic acids. The base layer is preferably comprised of polyethylene terephthalate. Examples of other suitable aliphatic diols are diethylene glycol, triethylene glycol, aliphatic glycols of the formula HO—$(CH_2)_n$—OH, where n is an integer from 3 to 6 (in particular propane-1,3-diol, butane-1,4-diol, pentane-1,5-diol, and hexane-1,6-diol), or branched aliphatic glycols having up to 6 carbon atoms. Among the cycloaliphatic diols, mention should be made of cyclohexanediols (in particular cyclohexane-1,4-diol). Examples of other suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Other suitable bisphenols are those of the formula HO—$C_6H_4$—$C_6H_4$—OH.

Preferred other aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, particularly suitable compounds are the ($C_3$-$C_{19}$)alkanediacids, where the alkane moiety may be straight-chain or branched.

The polyesters can by way of example by prepared by the known transesterification process. In this, the starting materials are dicarboxylic esters and diols, these being reacted with the conventional transesterification catalysts, such as zinc salts, calcium salts, lithium salts, magnesium salts, and manganese salts. The intermediates are then polycondensed in the presence of well-known polycondensation catalysts, such as antimony trioxide or titanium salts. They can also equally well be prepared by the direct esterification process in the presence of polycondensation catalysts. Here, the dicarboxylic acids and the diols are used directly as starting materials.

Outer Layer (A)

The polymers used for the outer layer (A), for any further outside layer (C) present, and for any intermediate layers (D) and (E) present are preferably the same as those cited above for the base layer (B). It is particularly preferable that the base layer and the further layers comprise identical polymers (polyesters).

White Pigment

To achieve the abovementioned properties, in particular the desired whiteness and the desired opacity of the film, the necessary white pigment is incorporated into the base layer (B) and at least into one outer layer (A), and also optionally into other layers present. According to the invention, the film comprises barium sulfate as sole white pigment, the amount of barium sulfate preferably being in the range from 5 to 25% by weight, based on the weight of the layers comprising the barium sulfate. The barium sulfate is preferably fed in during preparation of the polymer, the barium sulfate particles usually being added to the glycol from which the polyester is prepared.

In one preferred embodiment, precipitated grades of barium sulfate are used. Precipitated barium sulfate is obtained from barium salts and sulfates or sulfuric acid in the form of a fine-particle colorless powder whose grain size can be controlled via the conditions of precipitation. Precipitated barium sulfate can be prepared by the conventional processes described in Kunststoff-Journal 8, No. 10, 30-36 and No. 11, 36-31 (1974).

In order to achieve the desired whiteness (preferably >70) and the desired low transparency (preferably <40%) of the film, according to the invention, the base layer (B) has high filler content. According to the invention, the amount of barium sulfate for achievement of the desired low transparency is from 5 to 25% by weight, preferably from 10 to 25% by weight, and particularly preferably from 15 to 25% by weight, based on the total weight of this layer.

The median particle size ($d_{50}$ value) of the barium sulfate is preferably in the range from 0.1 to 5 µm, particularly preferably in the range from 0.2 to 3.0 µm.

For further control of whiteness, in one particular embodiment it is possible to add suitable optical brighteners to the base layer and/or to the other layers. Examples of suitable optical brighteners are HOSTALUX® KS from Clariant or EASTOBRITE® OB-1 from Eastman.

According to the invention, the outer layer (A), and if appropriate also the further outer layer (C) and, if appropriate, further intermediate layers (D) and (E) comprise(s) an amount of barium sulfate which is preferably from 5 to 25% by weight, as sole white pigment. The concentration of the white pigment here is preferably selected in such a way that the (Berger) whiteness of the film is preferably greater than 70. Otherwise, the optical properties of the film are less suitable for the preferred application (e.g. photographic layer substrate, sleeve label, or medical application), because the film can be excessively translucent.

If the outer layer (A) comprises a concentration smaller than 4% by weight of the whitening pigment, the brilliant white character of the film is lost, and the print applied subsequently on this side appears to the observer to be defective. If the outer layer (A) comprises a concentration greater than 25% by weight of the whitening pigment, there is great risk of chalking of the white pigment.

The statements made for the base layer are applicable in relation to concentration ranges, quality, and particle size of the barium sulfate.

It has been found that the windability of the film and the presentation of the roll can be markedly improved if the outer layer (A) and, if appropriate, also the further outer layer (C) also comprise(s) an antiblocking agent. It has been found here that in particular the median particle diameter ($d_{50}$) and the concentration of the antiblocking agent used additionally in outer layer (A) and optionally (C) are important for good windability and for good proccessability of the film.

In order to improve winding and proccessability of the film, at least the outer layer (A) comprises not only the white pigment but also an antiblocking agent, in which the median diameter ($d_{50}$ value) is in the range from 2 to 8 µm.

In the preferred embodiment, the outer layer (A) comprises an antiblocking agent in which the median diameter is in the range from 2.1 to 7.0 µm, and in the particularly preferred embodiment the outer layer (A) comprises an antiblocking agent in which the median diameter is in the range from 2.2 to 6 µm.

If, in contrast, the outer layer (A) comprises an antiblocking agent in which the median diameter is outside the inventive range, this has an adverse effect on the winding, the proccessability, and the optical properties of the film.

If the outer layer (A) comprises an antiblocking agent in which the median diameter is greater than 8 µm, the optical properties and the winding of the film become poorer.

If, in contrast, the outer layer (A) of the film comprises an antiblocking agent in which the median diameter is smaller than 2 µm, the winding of the film, and thus the presentation of the roll, becomes poorer.

The outer layer (A) and, if appropriate, also the further outer layer (C) are equipped with the antiblocking agent in order to improve winding performance and proccessability. The concentration of the antiblocking agents in the outer layer (A) and, if appropriate, also in the further outer layer (C) is from 0.05 to 3.5% by weight in the preferred embodiment, and is from 0.1 to 3.0% by weight in the particularly preferred embodiment, and in essence depends on the optical properties to be achieved and on the windability to be achieved by the film.

Typical antiblocking agents are inorganic and/or organic particles, e.g. calcium carbonate, amorphous silica, talc, magnesium carbonate, barium carbonate, calcium sulfate, lithium phosphate, calcium phosphate, magnesium phosphate, aluminum oxide, calcined clay, lithium fluoride, the calcium, barium, zinc, or manganese salts of the dicarboxylic acids used, kaolin, or crosslinked polystyrene particles or acrylate particles.

Other antiblocking agents that can be used are mixtures of two or more different antiblocking agents or mixtures of antiblocking agents of the same constitution but of different particle size, if the mixtures comply with the conditions stated above in relation to total amount and median particle diameter. The antiblocking agents can be added to the individual layers in the respective advantageous concentrations, e.g. in the form of glycolic dispersion during polycondensation or by way of masterbatches during extrusion.

Addition of antiblocking agents in the inventive concentration at least to the outer layer (A) also has the desired favorable effect on roughness and on the coefficient of friction of the outer layer (A). In order to improve the processing performance of the film further, the concentration of the antiblocking agent should advantageously be selected in such a way that the following values are achieved for roughness and for the coefficient of friction:

The coefficient of friction (COF) of side (A) with respect to itself should preferably be smaller than or equal to 0.4. Otherwise, the film gives unsatisfactory winding performance and further processing.

The roughness of the outer layer (A), expressed as its $R_a$ value, should preferably be from 40 to 150 nm. $R_a$ values smaller than 40 nm have adverse effects on the winding performance and processing performance of the film, and $R_a$ values greater than 150 nm impair the optical properties (gloss) of the film.

It is particularly preferable that the base layer and the outer layers A and C comprise barium sulfate as sole whitening pigment at identical concentration in all of the layers. It is likewise preferable that an identical pigment, in particular silicon dioxide, is used in each case as antiblocking agent in the outer layers.

The thickness of the outer layer (A) and/or (C) in the film is generally in the range from 0.4 µm to 6 µm, preferably in the range from 0.5 to 5 µm, and particularly preferably in the range from 0.6 to 4 µm.

The base layer (B), and also the further layers, e.g. (A) and (C), can also comprise conventional additives, e.g. stabilizers. They are usually added to the polymer or polymer mixture prior to melting. Examples of stabilizers used are phosphorus compounds, such as phosphoric acid or phosphoric esters.

The thickness of the polyester film of the present invention can vary-within wide-limits. It is preferably from 5 to 500 µm, in particular from 8 to 400 µm, and particularly preferably from 10 to 300 µm, the proportion represented by the base layer preferably being from 50 to 95% of the total thickness.

Production Process

The present invention also provides a process for production of the inventive films. It encompasses production of a multilayer film comprised of a base layer (B) and, for example, outer layers (A) and (C) via coextrusion and shaping of the melts to give a flat melt film, biaxial stretching of the film, and heat-setting of the stretched film.

First, each polymer or polymer mixture for the individual layers is compressed and plastified in an extruder. The melts are mutually superposed by being simultaneously extruded through a flat-film die, and the extruded multilayer film is drawn off on one or more take-off rolls, whereupon it cools and solidifies.

The biaxial orientation is generally carried out sequentially. It is preferable here to orient first longitudinally (i.e. in machine direction=MD) and then to orient transversely (i.e. perpendicularly to machine direction=TD). Longitudinal orientation can be carried out with the aid of two rolls running at different speeds corresponding to the desired stretching ratio. For transverse orientation, an appropriate tenter frame is generally used.

The temperature at which the biaxial orientation can generally be carried out, in particular for PET, can vary in a relatively wide range, and depends on the desired properties of the film. Longitudinal stretching is generally carried out at from about 70 to 140° C. and transverse stretching at from about 80 to 150° C. The longitudinal stretching ratio $\lambda_{MD}$ is preferably in the range from 2:1 to 5:1. The transverse stretching ratio $\lambda_{TD}$ is generally in the range from 2.5:1 to 5:1. Prior to transverse stretching, one or both surfaces of the film can be in-line coated by the known processes. In-line coating can by way of example serve for improved adhesion of a metal layer or of any printing ink subsequently to be applied, or else for improvement of antistatic performance or of processing performance.

In the heat-setting which follows, the film is kept for from about 0.1 to 10 s at a temperature of from about 150 to 250° C. The film is then conventionally wound up.

One or both surfaces of the film is/are preferably corona- or flame-treated by one of the known methods after biaxial stretching. The intensity of treatment is generally above 50 mN/m².

The inventive film exhibits very good handling, very good winding properties, and very good processing performance. The inventive film is suitable as packaging material for foods and other consumable items, as photographic layer substrate, or as sleeve label, or for medical application.

The film of the present invention also has excellent optical properties and exhibits excellent further processing properties, and excellent presentation of the roll, the very good handling of the film and its very good processing properties make it particularly suitable for processing on high-speed machinery. The film also has excellent whiteness, which also gives the film a highly attractive appearance effective for promotional purposes.

It has been ensured that regrind, for example arising as cut material during production of the film, can be reintroduced to the extrusion process during production of the film at a concentration of from about 20 to 60% by weight, based on the total weight of the film, without any significant resultant adverse effect on the physical properties of the film.

The table below (table 1) once again collates the most important preferred properties of the film.

reflectance photometer from Zeiss, Oberkochem (DE), standard illuminant C, 2° standard observer. Whiteness WG is defined as $$WG=RY+3RZ-3RX,$$

where RX, RY, RZ are corresponding reflectance factors using an X, Y or Z color-measurement filter. The white standard used comprises a barium sulfate pressing (DIN 5033, part 9). A detailed description is provided by way of example in Hansl Loos, Farbmessung [Color measurement], Verlag Beruf und Schule, Itzehoe (1989).

SV (Standard Viscosity)

Standard viscosity SV (DCA) is measured at 25° C. in dichloroacetic acid by a method based on DIN 53726. Intrinsic viscosity (IV) is calculated from standard viscosity as follows:

$$IV[\eta]=6.907\cdot 10^{-4}SV(DCA)+0.063096 \ [dl/g]$$

Coefficient of Friction

TABLE 1

|  | Preferred | Particularly preferred | Very particularly preferred | Unit | Test method |
|---|---|---|---|---|---|
| Base layer B | | | | | |
| Concentration of barium sulfate (white pigment) | 5 to 25 | 10 to 25 | 15 to 25 | % by wt. | |
| Outer layer A | | | | | |
| Concentration of barium sulfate (white pigment) | 5 to 25 | 10 to 25 | 15 to 25 | % by wt. | |
| Concentration of antiblocking agent | 0.01 to 4 | 0.05 to 3.5 | 0.1 to 3 | % by wt. | |
| Particle diameter ($d_{50}$) of antiblocking agent | 2 to 8 | 2.1 to 7 | 2.2 to 6 | μm | |
| Average roughness $R_a$ of side A | 40 to 150 | 43 to 140 | 46 to 130 | nm | DIN 4762 |
| Coefficient of friction COF of side A with respect to side A | smaller than or equal to 0.40 | smaller than or equal to 0.35 | smaller than or equal to 0.30 | | DIN 53375 |
| Thickness of outer layer A | 0.4 to 6 | 0.5 to 5 | 0.6 to 4 | μm | |
| Properties of film | | | | | |
| Thickness of film | 5 to 500 | 8 to 400 | 10 to 300 | μm | |
| Berger whiteness of film | >70 | >85 | >100 | | |
| Transparency of film | <40 | <35 | <30 | % | ASTM D1003-00 |
| Gloss of outer layer A at 20° measurement angle | <40 | <35 | <30 | | DIN 67530 |

The following test methods are used to characterize the raw materials and the films:

| DIN = | Deutsches Institut für Normung [German Institute for Standardization] |
|---|---|
| ASTM = | American Society for Testing and Materials |

Transparency

Transparency is measured by a method based on ASTM D1003-00.

Roughness

The arithmetic average roughness value $R_a$ is determined to DIN 4762.

Whiteness

Whiteness is determined by the Berger method, generally by mutually superposing more than 20 layers of film. Whiteness is determined with the aid of an ELREPHO electrical The coefficient of friction is determined to DIN 53 375. The coefficient of sliding friction is measured 14 days after production.

Gloss

Gloss is determined to DIN 67 530. Reflectance is measured, this being an optical value characteristic of a film surface. Using a method based on the standards ASTM D523-78 and ISO 2813, the angle of incidence is set at 20°. A beam of light hits the flat test surface at the set angle of incidence and is reflected or scattered by the surface. A proportional electrical variable is displayed, representing light rays hitting the photoelectronic detector. The value measured is dimensionless.

Measurement of Median Diameter $d_{50}$

Median diameter $d_{50}$ is determined by means of a laser on a Malvern Mastersizer (Malvern Instruments, Ltd., GB), using the standard method (examples of other measurement equipment being Horiba LA 500 or Sympathec Helos, which use the same measurement principle). For the test, the specimens are placed with water in a cell and this is then placed in the measurement equipment. The measurement procedure is automatic and also includes the mathematical determination of $d_{50}$ (see FIG. 1). $d_{50}$ here is defined as determined as follows from the "relative" cumulative particle size distribution curve: the desired $d_{50}$ is directly given on the abscissa axis by the intersection of the 50% ordinate value with the cumulative curve. FIG. 1 illustrates in more detail what is meant by this.

Winding Performance of Film

The winding performance of the film is visually assessed when the machine roll is wound up directly after biaxial orientation.

+: Winding of the machine roll is satisfactory. No creasing, no wandering of the film web and no blocking points caused by blocking of film layers were observed.

−: Winding of the machine roll is defective. At least one of the following defects was observed: creasing, wandering of the film web, blocking points caused by blocking of film layers.

Presentation of the Roll

Presentation of the roll is visually assessed after slitting of the machine roll to give narrower customer rolls.

+: Winding of the customer roll is satisfactory. No creasing, no corrugations in the film web and no blocking points caused by blocking of film layers were observed.

−: Winding of the customer roll is defective. At least one of the following defects was observed: creasing, corrugations in the film web, blocking points caused by blocking of film layers.

Processing Performance of Film

Processing performance of the film is assessed visually during production of lids (lid films).

+: The processing performance of the film is satisfactory. By way of example, no curling and no lodging of the lid in the sealing equipment, etc., was observed.

−: The processing performance of the film is defective. At least one of the following defects was observed: curling, lodging of the lid in the sealing equipment.

Example 1

Chips comprised of polyethylene terephthalate comprising barium sulfate as white pigment were dried and introduced into the extruder for the base layer (B). Chips comprised of polyethylene terephthalate comprising barium sulfate as white pigment and an antiblocking agent were likewise dried and introduced to the extruder for the two (identical) outer layers (A).

A white, three-layer film with ABS structure was then produced via coextrusion and subsequent stepwise longitudinal and transverse orientation, its total thickness being 60 μm. The thickness of the two outer layers was in each case 2 μm.

Base Layer (B):

100% by weight of polyethylene terephthalate with 20% by weight of barium sulfate (BLANC FIXE XR-HX, Sachtleben Chemie) as white pigment and with SV value of 800

Outer Layer (A), a Mixture Comprised of:

85% by weight of polyethylene terephthalate with 20% by weight of barium sulfate (BLANC FIXE XR-HX, Sachtleben Chemie) as white pigment and with SV value of 800

15% by weight of masterbatch comprised of 97.5% by weight of polyethylene terephthalate (SV value of 800) and 2.5% by weight of SYLOBLOC® 44 H (synthetic $SiO_2$ from Grace, diameter=2.5 μm)

The production conditions in the individual steps of the process were:

| Extrusion | Temperatures | Layer A: | 280° C. |
|---|---|---|---|
| | | Layer B: | 280° C. |
| | | Layer A: | 280° C. |
| | Temperature of take-off roll | | 20° C. |
| Longitudinal stretching | Temperature | | 70-120° C. |
| | Longitudinal stretching ratio | | 3.2 |
| Transverse stretching | Temperature | | 80-135° C. |
| | Transverse stretching ratio | | 3.8 |
| Setting | Temperature | | 230° C. |
| | Duration | | 3 s |

A film was obtained with very good optical properties, very good winding performance, very good winding quality, and very good processing performance.

Example 2

In comparison with Example 1, the only factor now changed was the constitution of the outer layers (A). All of the other parameters were retained.

Outer Layer (A), a Mixture Comprised of:

88% by weight of polyethylene terephthalate with 20% by weight of barium sulfate (BLANC FIXE XR-HX, Sachtleben Chemie) as white pigment and with SV value of 800

12% by weight of masterbatch comprised of 97.5% by weight of polyethylene terephthalate (SV value of 800) and 2.5% by weight of SYLOBLOC® 44 H (synthetic $SiO_2$ from Grace, diameter=2.5 μm)

Comparative Example 1

In comparison with Example 1, the only factor that now changed was the constitution of the outer layers (A). The antiblocking agent in the outer layers was omitted. All of the other parameters were retained.

Outer Layer (A), a Mixture Comprised of:

100% by weight of polyethylene terephthalate with 20% by weight of barium sulfate (BLANC FIXE XR-HX, Sachtleben Chemie) as white pigment and with SV value of 800

The results of the inventive/comparative examples have been collated in table 2.

TABLE 2

| | Whiteness of film | Transparency [%] | Gloss Angle of measurement 20° | | Average roughness $R_a$ of side A [nm] | Coefficient of friction COF side A with respect to side A | Winding performance | Presentation of roll | Processing performance |
|---|---|---|---|---|---|---|---|---|---|
| | | | Side A | Side C | | | | | |
| Example | | | | | | | | | |
| 1 | 110 | 25 | 18 | 18 | 56 | 0.30 | + | + | + |
| 2 | 111 | 26 | 20 | 20 | 50 | 0.29 | + | + | + |
| Comparative Example | | | | | | | | | |
| 1 | 112 | 23 | 40 | 40 | 34 | 0.42 | − | − | − |

The invention claimed is:

1. A white, biaxially oriented polyester film, which has a base layer (B) and has at least one outer layer (A), where
   a) the base layer (B) comprises, as sole whitener, a concentration of from 5 to 25% by weight of barium sulfate, and
   b) the outer layer (A) comprises, as sole whitener, a concentration of from 5 to 25% by weight of barium sulfate having a median diameter in the range from 0.1 to 5 μm, and also comprises from 0.01 to 4% by weight of antiblocking agent whose median diameter ($d_{50}$ value) is from 2 to 8 μm,
   wherein said film exhibits a Berger whiteness greater than 70 and the average roughness of the outer layer (A) is from 40 to 150 nm.

2. The polyester film as claimed in claim wherein the whitener is a precipitated barium sulfate.

3. The polyester film as claimed in claim 1, wherein the whitener in the base layer (B) and in the outer layer (A) is precipitated barium sulfate.

4. The polyester film as claimed in claim 1, wherein the antiblocking agent is silicon dioxide.

5. The polyester film as claimed in claim 1, wherein the base layer (B) is comprised of at least 80% by weight of a thermoplastic polyester.

6. The polyester film as claimed in claim 5, wherein the thermoplastic polyester of the base layer (B) is polyethylene terephthalate.

7. The polyester film as claimed in claim 5, wherein the outer layer (A) also comprises thermoplastic polyester and the thermoplastic polyester of the base layer (B) and the thermoplastic polyester of the outer layer (A) are identical.

8. The polyester film as claimed in claim 1, wherein the thermoplastic polyester of the base layer (B) has units comprising ethylene glycol and terephthalic acid and/or units comprising ethylene glycol and naphthalene-2,6-dicarboxylic acid.

9. The polyester film as claimed in claim 1, which has an ABC layer structure, where the outer layers (A) and (C) are identical or different.

10. The polyester film as claimed in claim 1, which has an ABA layer structure.

11. The polyester film as claimed in claim 1, wherein the average roughness of the outer layer (A) is from 43 to 130 nm.

12. The polyester film as claimed in claim 1, wherein the coefficient of friction of the outer layer (A) with respect to the outer layer (A) is smaller than or equal to 0.4.

13. The polyester film as claimed in claim 1, wherein said film exhibits a Berger whiteness greater than 85.

14. A process for production of a polyester film as claimed in claim 1, comprising the steps of
   a) producing a multilayer film via coextrusion,
   b) biaxial stretching of the film, and
   c) heat-setting of the stretched film.

15. Packaging materials for foods and other consumable items, labels, photographic layer substrates, and/or medical materials comprising polyester film as claimed in claim 1.

* * * * *

UNITED STATES PATENT AND TRADEMARK OFFICE
CERTIFICATE OF CORRECTION

| | | |
|---|---|---|
| PATENT NO. | : 7,829,175 B2 | Page 1 of 1 |
| APPLICATION NO. | : 11/693892 | |
| DATED | : November 9, 2010 | |
| INVENTOR(S) | : Jesberger et al. | |

It is certified that error appears in the above-identified patent and that said Letters Patent is hereby corrected as shown below:

Claims

Column 11

Claim 2, Line 31, insert --1-- after claim

Signed and Sealed this
Fourth Day of January, 2011

David J. Kappos
*Director of the United States Patent and Trademark Office*